United States Patent Office 2,867,618
Patented Jan. 6, 1959

2,867,618

3,4-DIHYDRO-2H-1,3-BENZOXAZINE

Raymond H. Rigterink, Midland, Mich., assignor to The Dow Chemical Company, Midland, Mich., a corporation of Delaware No Drawing. Application February 14, 1957
Serial No. 640,073

1 Claim. (Cl. 260—244)

This invention is concerned with 3,6-dicyclohexyl-3,4-dihydro-2H-1,3-benzoxazine having the structure

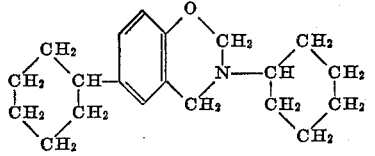

The new compound is a white, crystalline solid soluble in many common organic solvents and substantially insoluble in water. It is valuable as a parasiticide and insecticide. It is particularly useful in compositions employed for the control of bacterial organisms such as *Salmonella typhosa* and *Staphylococcus aureus* and for fungal organisms such as *Aspergillus terreus* and *Rhizopus nigricans*. It is also useful as a herbicide for the control of undesired vegetation.

The 3,6 - dicyclohexyl - 3,4 - dihydro - 2H - 1,3 - benzoxazine may be prepared by causing cyclohexylamine to react with formaldehyde to form an intermediate formaldehyde condensation product of the amine. The latter is then caused to react with 4-cyclohexylphenol to form the desired 3,6-dicyclohexyl-3,4-dihydro-2H-1,3-benzoxazine.

In carrying out the first step of the reaction, a molecular proportion of cyclohexylamine is added to two molecular proportions of formaldehyde in an appropriate solvent such as methanol or ethanol as reaction medium. The reaction takes place smoothly in the temperature range from 10° to 35° C. with the formation of the desired intermediate formaldehyde condensation product of cyclohexylamine. The reaction is somewhat exothermic and cooling may be required to maintain temperature control.

In the second step of the reaction, about one molecular proportion of 4-cyclohexylphenol or an alcoholic solution thereof is added to the reaction mixture prepared as described above. The reaction takes place smoothly when the mixture is heated in the temperature range of from 65° to 90° C. for a period of from 15 minutes to several hours. The mixture is usually stirred during the heating period to facilitate reaction. After completion of the reaction period, the mixture is heated under reduced pressure to distill the solvent and water of reaction and to recover as residue the desired 3,6-dicyclohexyl-3,4-dihydro-2H-1,3-benzoxazine. The latter may then be purified by conventional means.

In a representative operation, 30 grams (1.0 mole) of paraformaldehyde, 80 milliliters of methanol and 1 gram of potassium hydroxide were mixed together and heated to obtain a clear solution and then cooled. 49.5 grams (0.5 mole) of cyclohexylamine was added thereto in portions while stirring and cooling below 35° C. Thereafter 88.1 grams (0.5 mole) of 4-cyclohexylphenol was added and the resulting mixture heated at the reflux temperature under atmospheric pressure while stirring for a period of two hours to produce the 3,6-dicyclohexyl-3,4-dihydro-2H-1,3 - benzoxazine product. After completion of the heating, the methanol solvent was removed by vaporization at atmospheric pressure. The 3,6-dicyclohexyl-3,4-dihydro-2H-1,3-benzoxazine product was separated from unreacted material and by-product in the residue by adding aqueous alkali and toluene to the residue and thereafter extracting the desired product from the diluted residue with the toluene. The 3,6-dicyclohexyl-3,4-dihydro-2H-1,3-benzoxazine product was an amber, viscous liquid obtained in a yield of 131 grams or 87.7 percent of theoretical. After standing at room temperature for about 3 weeks, the product crystallized and after recrystallization from petroleum ether (boiling range of from 86° to 100° C.), melted at 62° to 65° C.

The 3,6 - dicyclohexyl - 3,4 - dihydro - 2H - 1,3 - benzoxazine product of the present invention is useful as a toxicant in insecticidal preparations for the control of houseflies, *Musca domestica*, cockroaches, *Periplaneta americana*, and confused flour beetle, *Tribolium confusum*. It is also useful for the control of aphids such as *Aphis fabae* (bean aphid). It may also be used to inhibit fungal growth. In a representative operation, 3,6-dicyclohexyl - 3,4 - dihydro - 2H - 1,3 - benzoxazine was added to melted nutrient agar medium to give a concentration therein of about 1 percent. The resultant culturing medium was poured into Petri dishes and the solidified surfaces of the latter inoculated with *Aspergillus terreus* and *Rhizopus nigricans* and incubated at 30° C. for 3 days. At the end of this period, complete inhibition of growth of the test organism was observed.

I claim:
3,6-dicyclohexyl-3,4-dihydro-2H-1,3-benzoxazine.

References Cited in the file of this patent
UNITED STATES PATENTS
2,806,031    Rigterink _____ Sept. 10, 1957
OTHER REFERENCES
Burke et al.: J. Am. Chem. Soc., 74, 1518–20 (1952).
Frear: Chemistry of the Pesticides, pages 290–293, 301, D. Van Nostrand Co. Inc., New York, 1955.